United States Patent
Hayashi et al.

(10) Patent No.: US 6,312,739 B1
(45) Date of Patent: Nov. 6, 2001

(54) PROCESSED EGG PRODUCT AND METHOD FOR PRODUCING THE SAME

(75) Inventors: Shigeko Hayashi; Yoshikazu Nakanishi, both of Kawasaki (JP)

(73) Assignee: Knorr Foods Co., Ltd., Kawasaki (JP)

( * ) Notice: Subject to any disclaimer, the term of this patent is extended or adjusted under 35 U.S.C. 154(b) by 0 days.

(21) Appl. No.: 09/494,701

(22) Filed: Jan. 31, 2000

(30) Foreign Application Priority Data

Sep. 16, 1999 (JP) .................................... 11-261459

(51) Int. Cl.⁷ ....................................... A23L 1/32
(52) U.S. Cl. ............................... 426/47; 426/614
(58) Field of Search ........................ 426/47, 614

(56) References Cited

U.S. PATENT DOCUMENTS 5,037,661 * 8/1991 Merchant et al. .

FOREIGN PATENT DOCUMENTS

0546215 A 6/1993 (EP) .
6-189713 7/1994 (JP) .
2618540 6/1997 (JP) .

OTHER PUBLICATIONS

Database WPI, Section Ch, Week 198711, Derwent Publications Ltd., Class D13, AN 1987–076430 of JP 62 029950 (Feb. 7, 1987).

Patent Abstracts of Japan, vol. 1999, No. 06, Mar. 31, 1999, Abstract of JP 07 147906 (Jun. 13, 1995).

* cited by examiner

Primary Examiner—Anthony J. Weier
(74) Attorney, Agent, or Firm—Frishauf, Holtz, Goodman, Langer & Chick, P.C.

(57) ABSTRACT

A processed egg product obtained by partially hydrolyzing, with a use of protease, the yolk to which a saccharide and lysophospholipids have been added. A method for producing a processed egg product, comprising the step of partially hydrolyzing yolk containing 1 to 30% of a saccharide based on the weight of the yolk and 3 to 20% of lysophospholipids based on the weight of the yolk with 0.01 to 0.3% of a protease based on the weight of the yolk.

8 Claims, No Drawings

PROCESSED EGG PRODUCT AND METHOD FOR PRODUCING THE SAME

BACKGROUND OF THE INVENTION

1. Field of the Invention

The present invention relates to a processed egg product and to a method for producing the same. More particularly, it relates to a processed egg product that can be imparted with heat stability when used in an emulsified food such as mayonnaise or dressings and to a method for producing the same.

2. Description of the Prior Art

Yolk is not only a food having a high nutritive value but also is an excellent emulsifier. Utilizing these characteristics, yolk has been used for producing many emulsified foods such as mayonnaise and dressings.

Recently, with the diversification of eating habits, mayonnaise and dressings and the like are used more often than ever in foods that are heated and processed. Accordingly, there has been an increasing demand for yolk applying for many types of foods, for example, retort salads, fillings, bread and the like.

For this reason, mayonnaise and dressings and the like that have heat stability are desired. However, those that use ordinary yolk as an emulsifier do not have sufficient heat stability. To improve this defect, a modified yolk has been proposed which has heat stability as a result of partial hydrolysis of yolk with a protease (Japanese Patent Kokai No. Hei 6-189713).

There is also a report that a protein complex consisting of lysophospholipids and a protein bonded to each other has an improved emulsifying ability so that its application is expected to extend to the field of foods and the like (Japanese Patent No. 2618540).

SUMMARY OF THE INVENTION

Recently, from the necessity that the requirement of microbiological stability of processed foods and the like be met more completely, there has been an tendency that yolk used as an emulsifier is required to have much higher heat stability. Although some improvement in heat stability has been recognized for the modified yolk obtained by the above, it is not satisfactory. There has been no reference to improvement in heat stability of the lysophospholipids-protein complex.

Therefore, an object of the present invention is to provide a processed egg product having heat stability that is further improved than that of modified yolk obtained by treating a yolk with a protease.

The present inventors have made intensive investigation with view to achieve the above object. As a result, they have found that a processed egg product obtained by partially hydrolyzing, with cause of protease, a yolk to which a saccharide and lysophospholipids have been added is more excellent than the conventional modified yolk subjected to a protease treatment only in view of usability of heat stability. The present invention has been achieved based on this finding.

Accordingly, the first aspect of the present invention provides a processed egg product obtained by partially hydrolyzing, with a use of protease, the yolk to which a saccharide and lysophospholipids have been added.

In the second aspect of the present invention, the saccharide may be a monosaccharide, a disaccharide or a hydrolysate of polysaccharide.

In the third aspect of the present invention, the saccharide may be glucose, glucose-fructose liquid sugar or starch syrup.

In the forth aspect of the present invention, the lysophospholipids may be one having a lyso conversion ratio of 50% or more.

The fifth aspect of the present invention provides a method for producing a processed egg product, comprising the step of partially hydrolyzing yolk containing 1 to 30% of a saccharide based on the weight of the yolk and 3 to 20% of lysophospholipids based on the weight of the yolk with 0.01 to 0.3% based on the weight of the yolk of a protease.

In the sixth aspect of the present invention, the saccharide may be a monosaccharide, a disaccharide or a hydrolysate of polysaccharide.

In the seventh aspect of the present invention, the saccharide may be glucose, glucose-fructose liquid sugar or starch syrup.

In the eighth aspect of the present invention, the lysophospholipids may be one having a lyso conversion ratio of 50% or more.

DETAILED DESCRIPTION OF THE INVENTION

The yolk used in the present invention may be a usual natural yolk liquid and is not particularly limited. For example, a yolk liquid obtained by breaking an egg and removing egg white is used generally. This may be diluted with water, if desired.

The saccharide may be either one of a monosaccharide, a disaccharide or a hydrolysate of polysaccharide. Examples of the monosaccharide include pentoses such as xylose, arabinose, and ribose, hexoses such as glucose and fructose. Examples of the disaccharide include sucrose, maltose, trehalose, lactose and the like. The hydrolysate of polysaccharide includes, for example, starch syrup and dextrin and the like. Also, glucose-fructose liquid sugar may be used.

The amount of saccharide to be added is suitably 1 to 30% by weight, preferably 3 to 20% by weight, based on the weight of yolk. If the weight of the saccharide to be added is less than 1% by weight, heat stability is not imparted sufficiently whereas if it exceeds 30% by weight, the viscosity of yolk increases abruptly and its handling tends to become difficult so that such an amount is not preferred.

The lysophospholipids to be added to yolk includes those obtained by hydrolyzing phospholipids extracted from yolk and soybean phospholipids or rapeseed phospholipids which are obtained as by-products at a production of vegetable oils with phospholipase A2. The ratio of lysophospholipids converted among the total phospholipids is called "lyso conversion ratio". The lysophospholipids used in the present invention preferably are one having a lyso conversion ratio of 50% or more. The upper limit of the lyso conversion ratio is about 99%. If the lyso conversion ratio is less than 50%, it is difficult to impart sufficient heat stability to the yolk so that such a lyso conversion ratio is not preferable.

The amount of lysophospholipid to be added is preferably 3 to 20% by weight based on the weight of yolk. If the addition amount of lysophospholipid is below 3% by weight, it is difficult to impart sufficient heat stability to the yolk. On the other hand, the addition amount of above 20% by weight makes it difficult for lysophospholipids to be dissolved in yolk so that such an addition amount is not preferable.

The proteases used in the hydrolysis of yolk are not particularly limited and any of those derived from microorganisms, plants and living organisms can be used. In the main, endo type proteases are used. For example, there can be used those enzymes under trade names Proteases A, N, P, S, M, and B, Prolezer FG-F (Amano Pharmaceutical Co., Ltd.), Flavorzyme, Alkalase (Novonordics Co., Ltd.), Punchdase NP-2, Punchdase HP, Alloase AP-10 (Yakult Pharmaceutical Co., Ltd.), Denapsin 10P, Denazyme AP, Bioplase SP-15FG, edible purified papain (Nagase Biochemical Co., Ltd.), Protin P, Protin A, Samoase (Daiwa Kasei Co., Ltd.), etc. These may be used singly or two or more of them may be used in combination.

The addition amount of protease is preferably 0.01 to 0.3% by weight based on the weight of yolk. If the addition amount of protease is below 0.01% by weight, the partial hydrolysis of yolk is insufficient, so that heat stability is not imparted to the yolk sufficiently. On the other hand, the addition amount of protease exceeding 0.3% by weight is not preferred since in that case bitter, astringent or the like unpleasant taste tends to occur, resulting unpreferably in a decreased quality of yolk flavor.

The conditions of the protease treatment are as follows. First, for pH, treatment is possible at a pH in the range of 5 to 8. However, it is convenient to conduct the treatment at the pH native to yolks (about 6.5) and heat stability can be imparted to yolk under this condition.

As the temperature condition, 50 to 65° C. is preferred. At below 50° C., microorganisms tend to propagate while at temperature above 65° C. no further increase in efficiency of hydrolysis is obtained so that such a temperature is not preferable.

As for the treatment time, a time of 1 to 24 hours is suitable. The treatment time may be adjusted from a short time to a long time depending on the kind and the addition amount of protease, the temperature condition, etc. However, taking the quality of yolk into consideration, a shorter treatment time up to 10 hours is preferred.

The degree of hydrolysis of yolk can be analyzed by SDS-polyacrylamide gel electrophoresis (SDS-PAGE). The term "partially hydrolyzed" means that at least the band having a molecular weight of about 220,000 daltons or more specific to a low-density lipoprotein (LDL) substantially disappeared (J. Food Sci., vol. 51, No. 5, 1115–1117, 1986).

After the hydrolysis treatment, the hydrolysis of yolk proceeds further to deteriorate the quality of yolk unless the protease is inactivated. So, it is necessary to thermally inactivate the protease under such conditions that the yolk is not thermally coagulated. For this reason, the protease used for the hydrolysis treatment is preferably one that is inactivated at a temperature not higher than 90° C. If the thermal inactivation temperature of the enzyme exceeds 90° C., thermal coagulation of yolk protein tends to occur. Once the yolk protein has coagulated, the emulsifying function of yolk and imparted heat stability are decreased greatly, so that such a high temperature is not preferable.

Hence, in the present invention, the protease is inactivated at a temperature of 70 to 90° C. In this case, the time of inactivation must be shorter and is usually 1 to 30 minutes.

The reason why the partial hydrolysis of a yolk to which a saccharide and lysophospholipids are added, with protease, results in imparting heat stability to the yolk is not always clear. It is presumed that the saccharide and yolk protein would be bonded to each other through Maillard reaction to form a kind of glycoprotein and at the same time the lysophospholipids would be incorporated into the phospholipids in the yolk so that these would form a well balanced sequence.

The processed egg product of the present invention is used mainly in emulsified foods such as mayonnaise and dressings. Since these are imparted with heat stability as described above, they can be put to a wider application than the conventional products.

The processed egg product of the present invention will not cause quality deterioration such as oil separation when exposed to the conditions of pressurized steam sterilization at 121° C. for 50 minutes. Therefore, sterilization treatment can be carried out during the production procedure of foods containing the processed egg product under such conditions that are quite effective against spore-forming microorganisms as well as general microorganisms. For this reason, the present invention fully meets the needs for complete microbiological stability of processed foods and the like.

According to the present invention, there can be provided a processed egg product having been further improved in usability of heat stability as compared with the modified yolk obtained by a protease treatment only. Emulsified foods produced using the processed egg product of the present invention can retain good physical properties when used in various foods that are subjected to heat processing.

EXAMPLES

Hereafter, the present invention will be described in detail by examples. However, the present invention is not limited thereto. Examples 1 to 6 and Comparative Examples 1 to 4

As a protease was used Protin A (Daiwa Kasei Co., Ltd.) and yolk was subjected to a partially hydrolysis treatment under the conditions shown in Table 1. That is, yolk (2 kg) having dissolved therein predetermined amounts of protease, glucose and lysophospholipid were filled in a 3-liter agitation tank and treated at 60° C. for 5 hours. As the lysophospholipid was used a preparation obtained from soybean lecithin as a raw material and having a lyso conversion ratio of 60%.

After the treatment, a yolk liquid (egg was broken and egg white was removed) was filled in a 200 ml plastic vessel in an amount of 150 g and then heated in a warm water at 75° C. for 20 minutes to inactivate the protease. After the inactivation of the enzyme the product was cooled with tap water.

In Comparative Example 2, the yolk liquid presented bitterness and hence it was not used in the production of mayonnaise.

TABLE 1

|  | Yolk | Water | Amount of protease | Amount of glucose | Amount of lysophospholipid |
|---|---|---|---|---|---|
| Example 1 | 2 Kg | 1 Kg | 0.2 g (0.01%) | 100 g (5.0%) | 80 g (4%) |
| Comparative Example 1 | 2 Kg | 1 Kg | 0.1 g (0.005%) | 100 g (5.0%) | 80 g (4%) |
| Example 2 | 2 Kg | 1 Kg | 4.0 g (0.2%) | 100 g (5.0%) | 80 g (4%) |
| Comparative Example 2 | 2 Kg | 1 Kg | 8.0 g (0.4%) | 100 g (5.0%) | 80 g (4%) |
| Example 3 | 2 Kg | 1 Kg | 2.0 g (0.1%) | 20 g (1.0%) | 80 g (4%) |
| Comparative Example 3 | 2 Kg | 1 Kg | 2.0 g (0.1%) | 2 g (0.1%) | 80 g (4%) |
| Example 4 | 2 Kg | 1 Kg | 2.0 g (0.1%) | 200 g (10.0%) | 80 g (4%) |
| Comparative Example 4 | 2 Kg | 1 Kg | 2.0 g (0.1%) | 100 g (5.0%) | 40 g (2%) |
| Example 5 | 2 Kg | 1 Kg | 2.0 g (0.1%) | 100 g (5.0%) | 80 g (4%) |
| Example 6 | 2 Kg | 1 Kg | 2.0 g (0.1%) | 100 g (5.0%) | 200 g (10%) |

( ) shows the percentage (%) based on yolk.

Next, using the partially hydrolyzed yolk except that of Comparative Example 2, 2 kg each of mayonnaise having the formulation shown in Table 2 was prepared using a colloid mill. 100 g each of the obtained mayonnaise was packed in a 200-ml plastic bag and the bag was sealed. This was heat treated at 121° C. for 50 minutes.

TABLE 2

| Raw Material | Formulation (% by weight) |
| --- | --- |
| Soybean Oil | 75.0% |
| Processed yolk | 7.5 |
| Table salt | 2.0 |
| Vinegar (10% acid degree) | 5.0 |
| Water | 10.5 |
| Total | 100.0 |

After the heat treatment, presence or absence of oil separation of said mayonnaise was observed with the naked eye and heat stability was evaluated in 3 ranks. That is, "good" which shows slight oil separation but has smooth physical properties and is excellent as a product; "fairly unacceptable" which shows oil separation and has fairly unacceptable physical properties; and "unacceptable" which shows considerable oil separation and has unacceptable physical properties. The results are shown in Table 3.

TABLE 3

| Sample | Evaluation of Heat Stability |
| --- | --- |
| Example 1 | Good |
| Comparative Example 1 | Unacceptable |
| Example 2 | Good |
| Example 3 | Good |
| Comparative Example 3 | Fairly unacceptable |
| Example 4 | Good |
| Comparative Example 4 | Unacceptable |
| Example 5 | Good |
| Example 6 | Good |

As will be apparent from Table 3, the mayonnaise preparations produced using the processed egg product of the present invention each retained good physical properties after the heat treatment at 121° C. for 50 minutes. On the contrary, Comparative Example 1, in which the addition amount of the protease was below the lower limit, Comparative Example 3, in which the addition amount of the saccharide was below the lower limit, and Comparative Example 4, in which the addition amount of the lysophospholipid was below the lower limit, showed severe oil separation and had unacceptable physical properties as a product.

Examples 7 and 8

Processed egg products were produced in the same manner as in Example 5 except that Bioplase SP-15FG (Nagase Biochemical Co., Ltd.) (Examples 7 and 8) was used as protease and in place of glucose was used starch syrup (DE: 47, solids content: 75%) (Example 7) or glucose-fructose liquid sugar (solids content: 75%) (Example 8).

Using the partially hydrolyzed yolk thus obtained, 2 kg of mayonnaise having the formulation as shown in Table 2 above was prepared using a colloid mill. 100 g each of the obtained mayonnaise was packed in a 200-ml plastic bag and the bag was sealed. This was heat treated at 121° C. for 50 minutes.

Then, presence or absence of oil separation of said mayonnaise was observed with the naked eye and heat stability was evaluated in 3 ranks as same as the above. As a result, it was evaluated "good"

Comparative Example 5

A processed egg product was produced in the same manner as in Example 5 except that as the lysophospholipid, there was used one having a lyso conversion ratio of 30% in place of one having a lyso conversion ratio of 60%.

Thereafter, mayonnaise was prepared in the same manner as described above and presence or absence of oil separation of the mayonnaise was observed with the naked eye and heat stability was evaluated in 3 ranks. As a result, it was evaluated "unacceptable".

Test Example 1

Three kinds of mayonnaise preparation received evaluations of "good", "fairly unacceptable" and "unacceptable" in the evaluation of heat stability in the Examples and Comparative Examples above were measured for diameter of colloidal particle using a laser diffraction particle size measuring apparatus (SALD-3000, Shimadzu Seisakusho Co., Ltd.).

As a result, one that was evaluated "good" had an average particle diameter of 15 $\mu$m or less. On the contrary, one that was evaluated "fairly unacceptable" had an average particle diameter of 15 to 30 $\mu$m and one that was evaluated "unacceptable" had an average particle diameter of 30 $\mu$m or more.

What is claimed is:

1. A processed egg product obtained by partially hydrolyzing, with a use of protease, the yolk to which a saccharide and lysophospholipids have been added.

2. The processed egg product, as claimed in claim 1, wherein the saccharide is a monosaccharide, a disaccharide or a hydrolysate of polysaccharide.

3. The processed egg product as claimed in claim 1, wherein the saccharide is glucose, glucose-fructose liquid sugar or starch syrup.

4. The processed egg product as claimed in claim 1, wherein the lysophospholipids are one having a lyso conversion ratio of 50% or more.

5. A method for producing a processed egg product, comprising the step of partially hydrolyzing yolk containing 1 to 30% of a saccharide based on the weight of the yolk and 3 to 20% of lysophospholipids based on the weight of the yolk with 0.01 to 0.3% of a protease based on the weight of the yolk.

6. The method for producing a processed egg product, as claimed in claim 5, wherein the saccharide is a monosaccharide, a disaccharide or a hydrolysate of polysaccharide.

7. The method for producing a processed egg product, as claimed in claim 5, wherein the saccharide is glucose, glucose-fructose liquid sugar or starch syrup.

8. The method for producing a processed egg product, as claimed in claim 5, wherein the lysophospholipids are one having a lyso conversion ratio of 50% or more.

* * * * *